(12) United States Patent
Leon

(10) Patent No.: US 7,736,103 B1
(45) Date of Patent: Jun. 15, 2010

(54) LAWN MOWER COVER DEVICE

(76) Inventor: Carl R. Leon, 724 Vintage Ave., Fairfield, CA (US) 94534

( * ) Notice: Subject to any disclaimer, the term of this patent is extended or adjusted under 35 U.S.C. 154(b) by 585 days.

(21) Appl. No.: 11/681,248

(22) Filed: Mar. 2, 2007

(51) Int. Cl.
*B62B 3/10* (2006.01)
(52) U.S. Cl. .................. 410/4; 280/47.26; 312/100; 52/69
(58) Field of Classification Search .......... 410/2, 410/3, 4; 312/219.1, 249.8, 327, 328, 100; 52/69, 68, DIG. 14; D15/17; 280/47.34, 280/47.35, 79.11, 33.991, 33.998, 47.26; 296/24.3
See application file for complete search history.

(56) References Cited

U.S. PATENT DOCUMENTS

| | | | | |
|---|---|---|---|---|
| 1,176,978 | A * | 3/1916 | Parker | 280/47.35 |
| 1,760,854 | A * | 5/1930 | Wright | 296/22 |
| 2,674,462 | A * | 4/1954 | Dracos et al. | 280/32.5 |
| 3,087,585 | A | 4/1963 | Knuth et al. | |
| 4,134,499 | A * | 1/1979 | Joswig | 211/66 |
| 4,673,227 | A | 6/1987 | Anderson | |
| 4,894,961 | A | 1/1990 | Robbins | |
| 5,533,616 | A * | 7/1996 | Crowfoot | 206/335 |
| 5,737,880 | A * | 4/1998 | Hayes et al. | 52/79.1 |
| 5,833,250 | A * | 11/1998 | Schier et al. | 280/47.19 |
| 5,992,811 | A * | 11/1999 | McFerren et al. | 248/316.3 |
| 6,012,253 | A * | 1/2000 | Burns | 52/79.5 |
| 6,034,355 | A * | 3/2000 | Naderi et al. | 219/387 |
| 6,260,865 | B1 * | 7/2001 | Yacobi et al. | 280/47.34 |
| 6,263,648 | B1 | 7/2001 | Carlson | |
| 6,332,554 | B1 | 12/2001 | McCarthy | |
| D512,728 | S | 12/2005 | Di Rienzo | |
| 7,322,586 | B1 * | 1/2008 | Zettel | 280/47.26 |
| 7,464,945 | B2 * | 12/2008 | Humphries et al. | 280/47.26 |

FOREIGN PATENT DOCUMENTS

CA 2161838 A * 5/1997

* cited by examiner

*Primary Examiner*—Patricia L Engle

(57) ABSTRACT

A lawn mower cover device for storing and securing a lawn mower for storage or transport includes a container receiving the lawn mower to protect the lawn mower. The container has an open rear end to permit the lawn mower to be inserted into the container. A handle is coupled to the container. The handle is graspable to facilitate relocation of the container. A door is hingedly coupled to the handle. The door is selectively pivoted over the open rear end of the container to close the open rear end. A plurality of wheels is rotatably coupled to the container. The wheels roll along a support surface to facilitate relocation of the container.

11 Claims, 5 Drawing Sheets

LAWN MOWER COVER DEVICE

BACKGROUND OF THE INVENTION

1. Field of the Invention

The present invention relates to yard equipment storage devices and more particularly pertains to a new yard equipment storage device for storing and securing a lawn mower for storage or transport.

2. Description of the Prior Art

The use of yard equipment storage devices is known in the prior art. While these devices fulfill their respective, particular objectives and requirements, the need remains for a device that has certain improved features that allow the device to be easily transported to different location with a lawn mower positioned in the device. Additionally, the device should include a plurality of clips to allow yard care implements to be attached to device.

SUMMARY OF THE INVENTION

The present invention meets the needs presented above by generally comprising a container receiving the lawn mower to protect the lawn mower. The container has an open rear end to permit the lawn mower to be inserted into the container. A handle is coupled to the container. The handle is graspable to facilitate relocation of the container. A door is hingedly coupled to the handle. The door is selectively pivoted over the open rear end of the container to close the open rear end. A plurality of wheels is rotatably coupled to the container. The wheels roll along a support surface to facilitate relocation of the container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
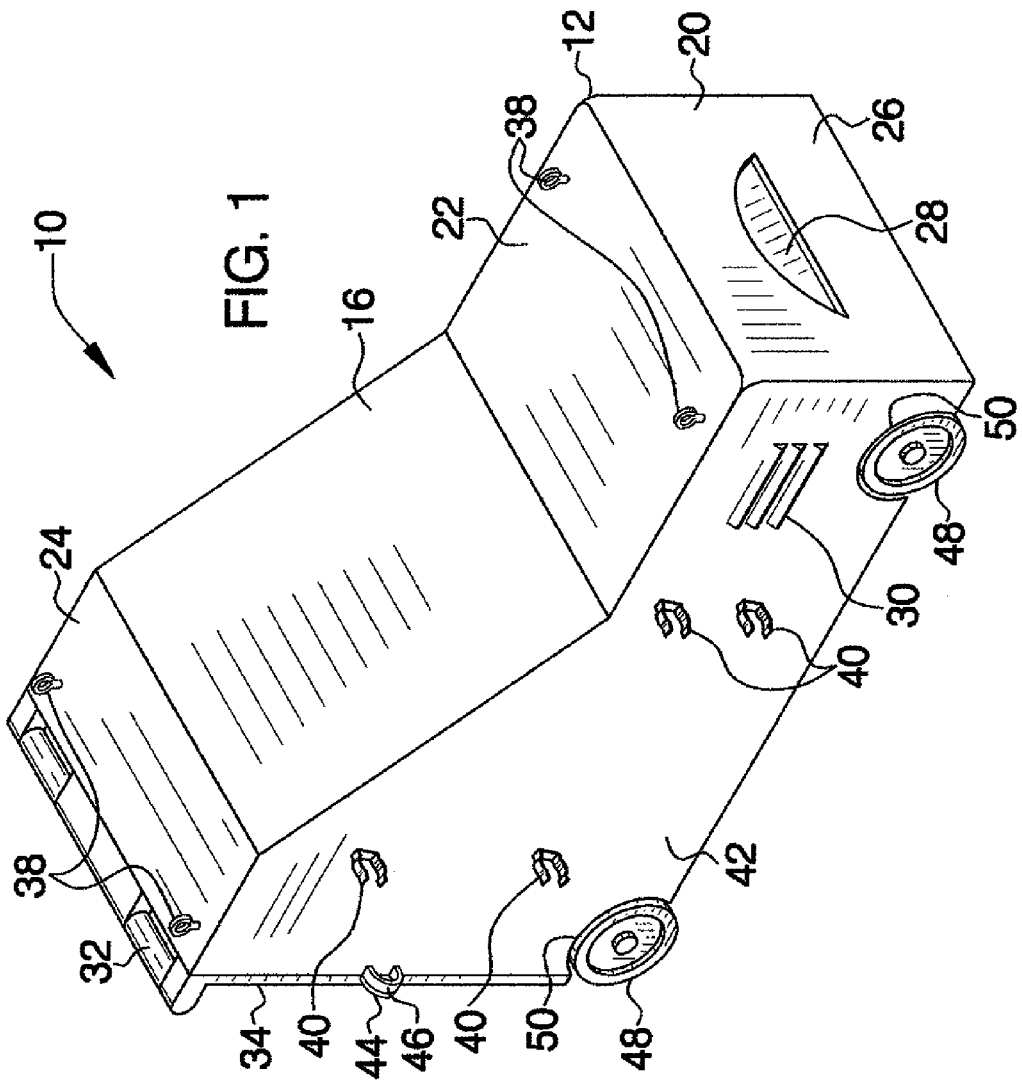
FIG. 1 is a top rear perspective view of a lawn mower cover device according to the present invention.
Figure 2:
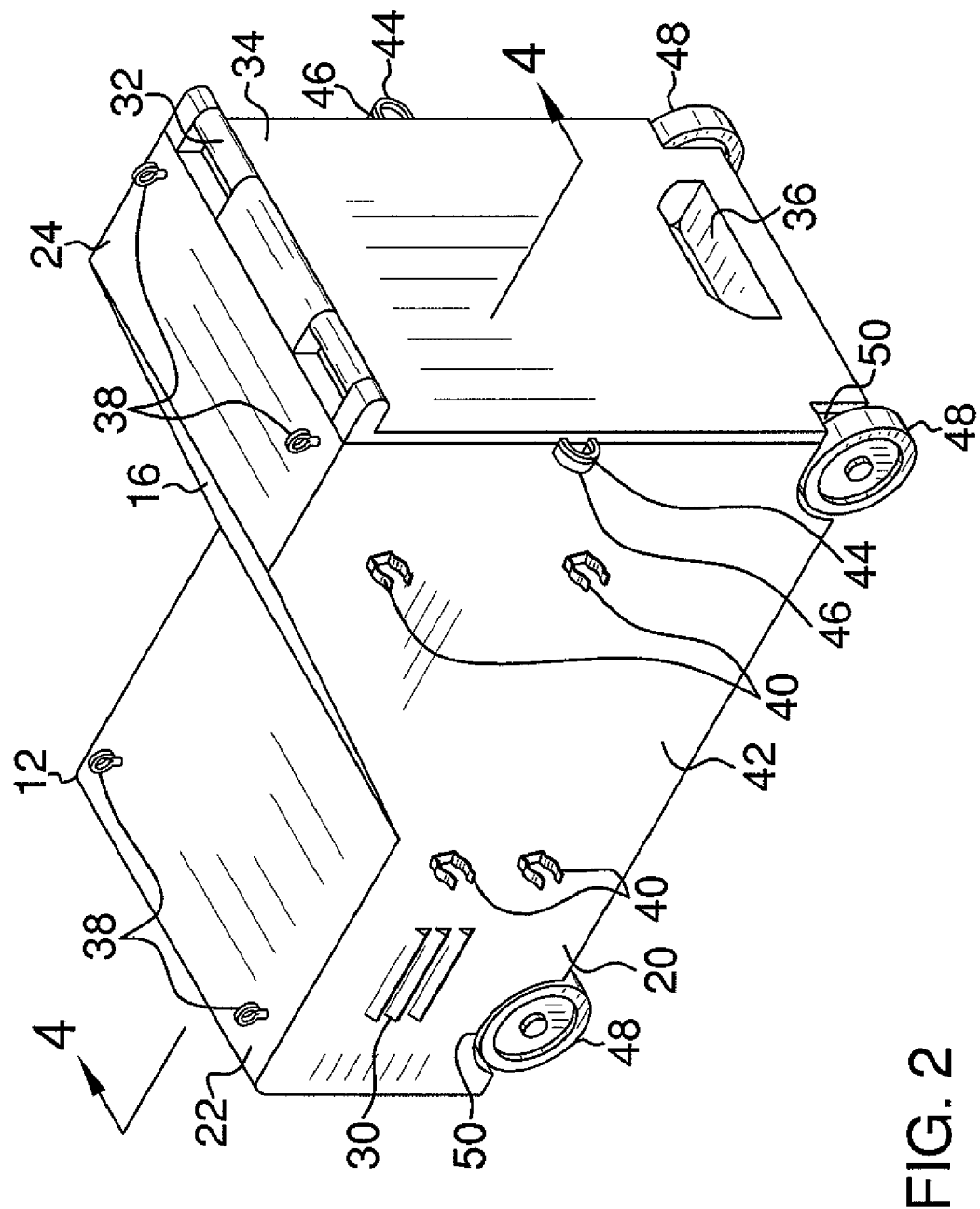
FIG. 2 is a top front perspective view of the present invention.
Figure 3:
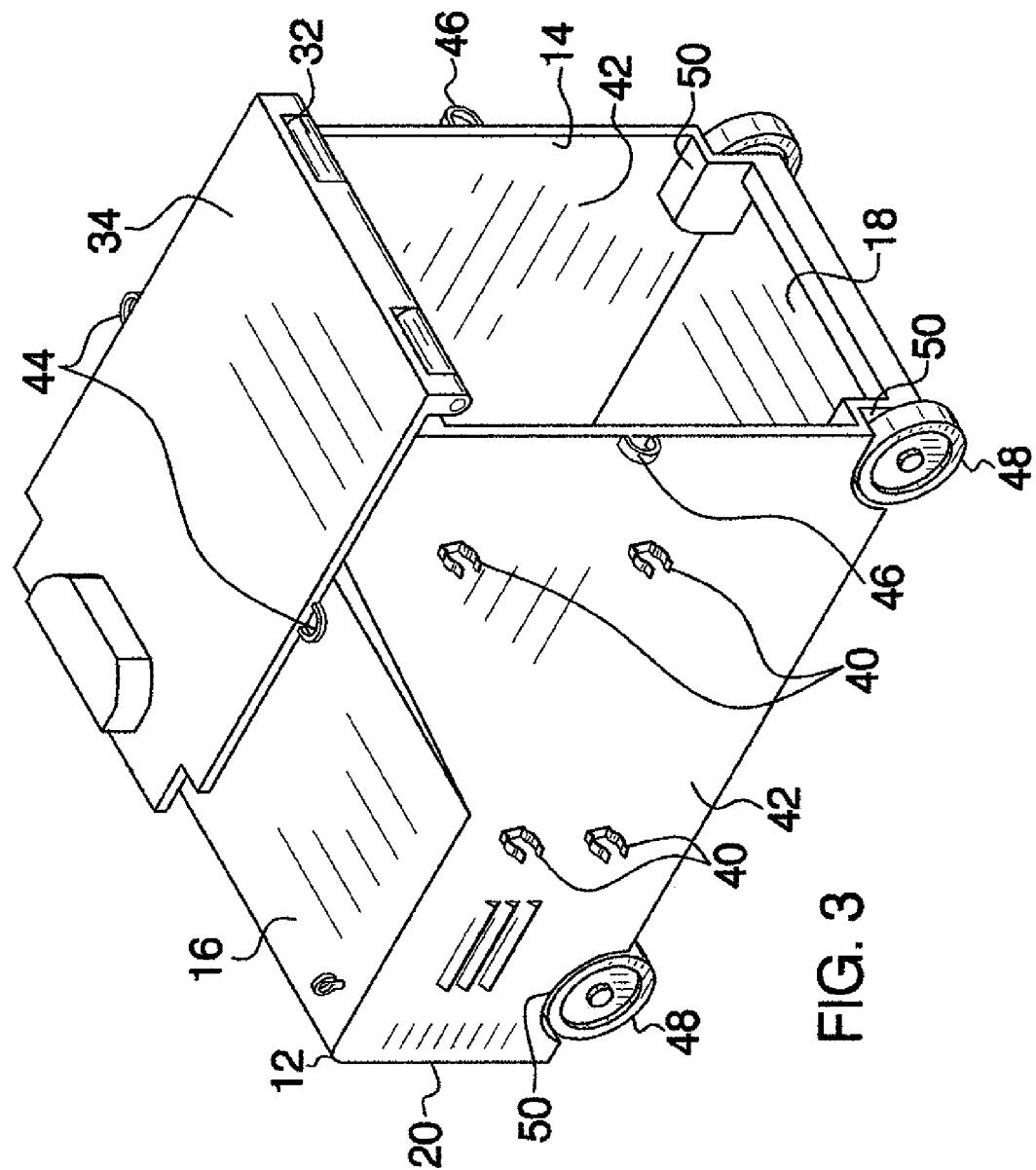
FIG. 3 is a top rear perspective view of the present invention with the door pivoted away from the open rear end.
Figure 4:
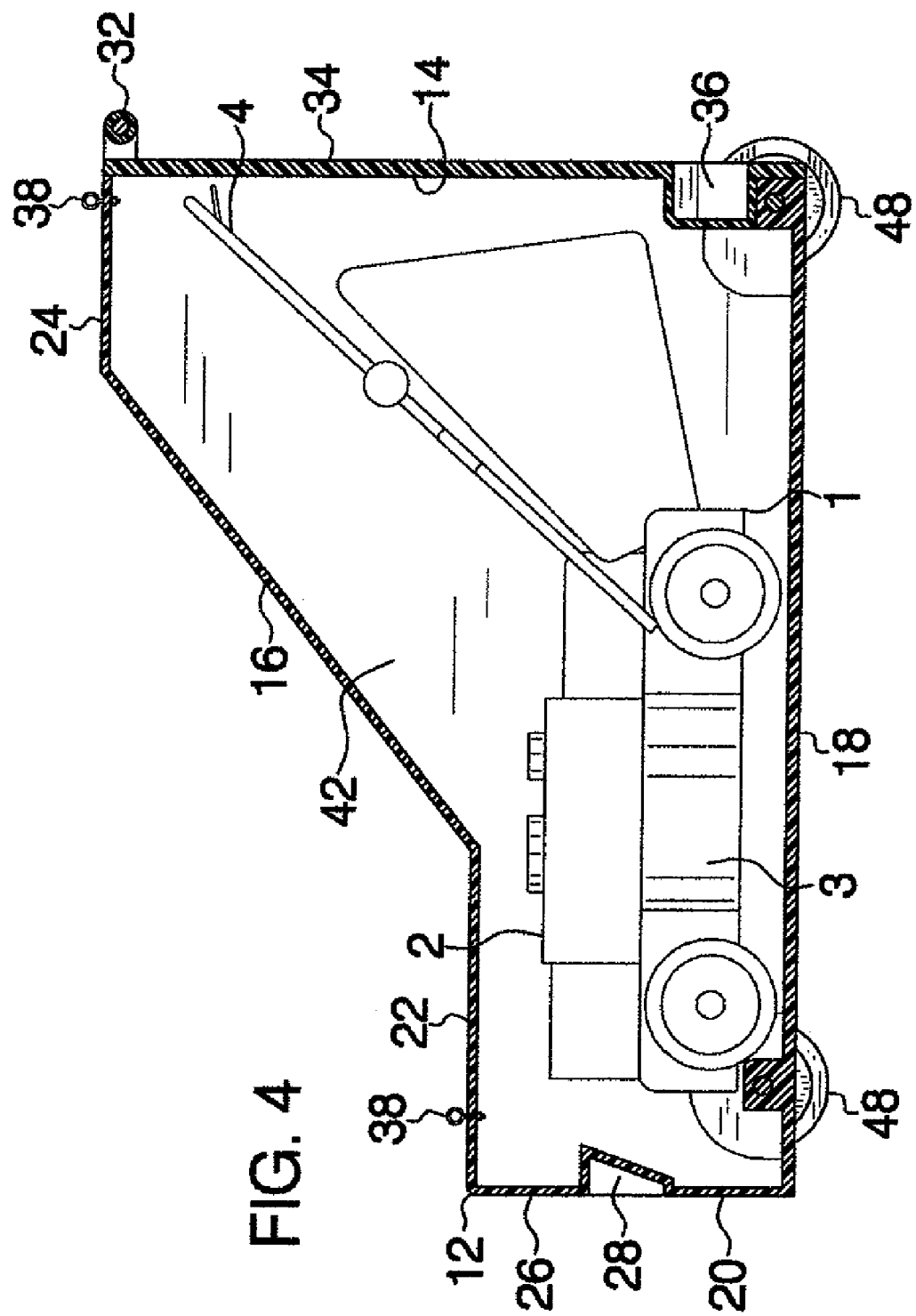
FIG. 4 is a cross-sectional view of the present invention taken along line 4-4 of FIG. 1.
Figure 5:
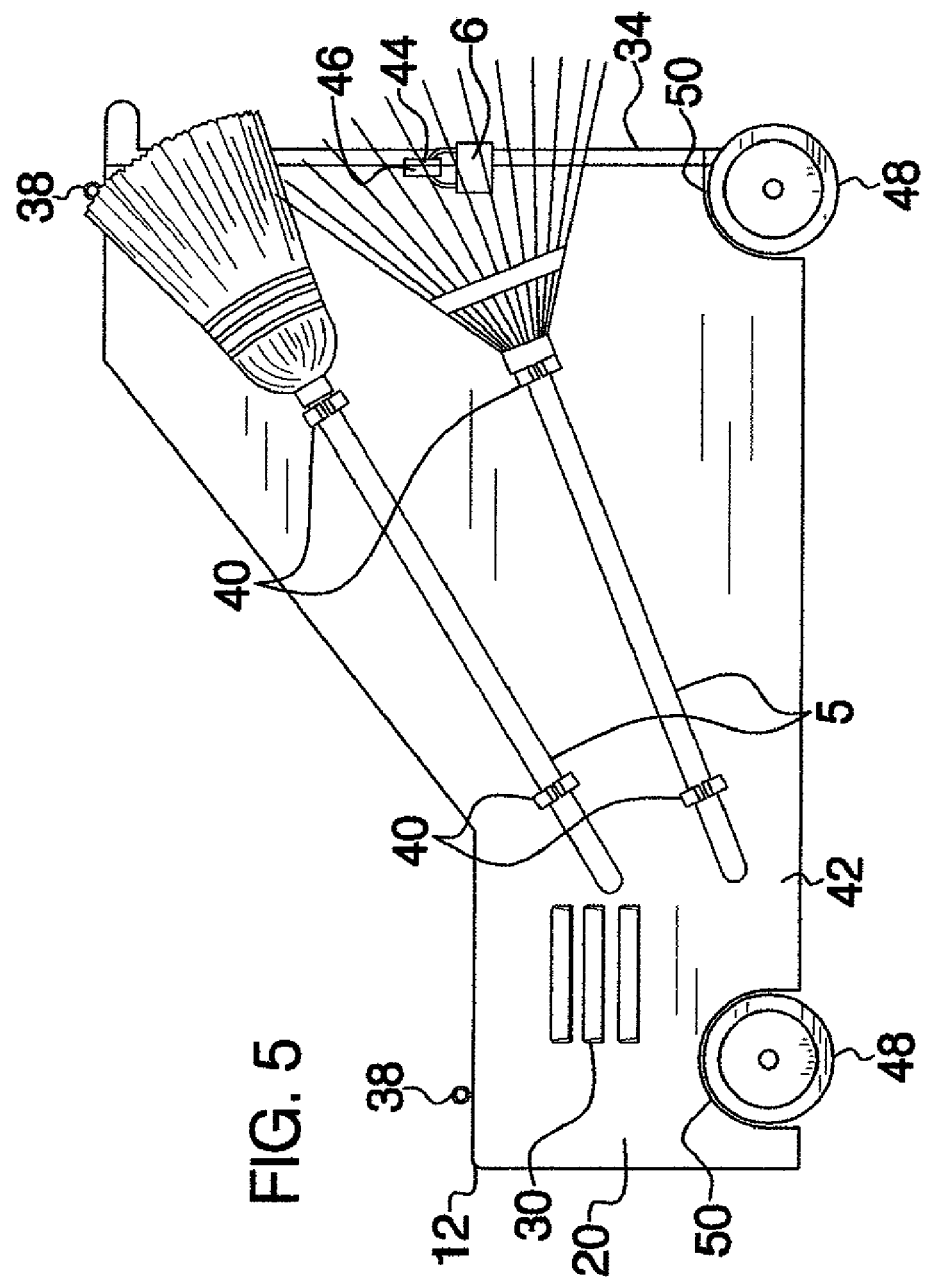
FIG. 5 is a side view of the present invention with yard care implements positioned in the clips.

With reference now to the drawings, and in particular to FIGS. 1 through 5 thereof, a new yard equipment storage device embodying the principles and concepts of the present invention and generally designated by the reference numeral 10 will be described.

As best illustrated in FIGS. 1 through 5, the lawn mower cover device 10 generally comprises a container 12 receiving a lawn mower 1 to protect the lawn mower 1. The container 12 has an open rear end 14 to permit the lawn mower 1 to be inserted into the container 12. The container 12 includes a top wall 16, a bottom wall 18 and a perimeter wall 20 extending between the top wall 16 and the bottom wall 18. The top wall 16 has a lower section 22 positioned over a motor 2 and a deck 3 of the lawn mower 1. The top wall 16 has an upper section 24 at a higher elevation than the lower section 22 to be positioned over a handle bar 4 of the lawn mower 1. The perimeter wall 20 has a front section 26 with a hand recess 28 to receive a hand to facilitate lifting of the container 12. The perimeter wall 20 has a plurality of vent slots 30 extending therethrough to permit fumes from the lawn mower 1 to vent out of the container 12. The container 12 has a length of approximately 6 feet, a width of approximately 2 feet and a height between approximately 43 and approximately 45 inches.

A handle 32 is coupled to the container 12. The handle 32 is graspable to facilitate relocation of the container 12. The handle 32 is positioned adjacent the top wall 16 and extends outwardly from the open rear end 14 of the container 12. A door 34 is hingedly coupled to the handle 32. The door 34 is selectively pivoted over the open rear end 14 of the container 12 to close the open rear end 14. The door 34 has a foot recess 36 to receive a foot to facilitate tipping of the container 12.

A plurality of tie downs 38 is coupled to the container 12. The tie downs 38 are used to secure the container 12 to a support structure. Each of the tie downs 38 is coupled to and extends upwardly from the top wall 16. A plurality of clips 40 is coupled to the container 12. The clips 40 are arranged in aligned pairs. A yard care implement 5 is inserted to one of the aligned pairs of the clips 40 to secure the yard care implement 5 to the container 12. Each of a pair of side sections 42 of the perimeter wall 20 has at least one aligned pair of the clips 40 coupled thereto.

At least one securing loop 44 is coupled to the door 34. At least one locking loop 46 is coupled to the container 12 and positioned adjacent the open rear end 14 of the container 12. The at least one locking loop 46 is aligned with the at least one securing loop 44 when the door 34 is positioned over the open rear end 14. The at least one securing loop 44 and the at least one locking loop 46 receive a lock 6 to secure the door 34 over the open rear end 14 when the at least one securing loop 44 and the at least one locking loop 46 are aligned.

A plurality of wheels 48 is rotatably coupled to the container 12. The wheels 48 roll along a support surface to facilitate relocation of the container 12. Each of a plurality of recessed wells 50 of the container 12 has one of the wheels 48 positioned therein. The recessed wells 50 are positioned in a juncture of the perimeter wall 20 and the bottom wall 18.

In use, the door 34 is pivoted away from the open rear end 14 of the container 12. The lawn mower 1 is then inserted through the open rear end 14 and rolled into the container 12. The door 34 is then pivoted back over the open rear end 14 and the lock 6 is inserted through the at least one securing loop 44 and the at least one locking loop 46 to secure the door 34 over the open rear end 14. The container 12 can then either be stored or rolled into a vehicle to transport the lawn mower 1 and the container 12 to a new location. The tie downs 38 are used to secure the container 12 to the vehicle during transport.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lawn mower cover device for covering a lawn mower, said device comprising:
    a container receiving the lawn mower to protect the lawn mower, said container having an open rear end to permit the lawn mower to be inserted into said container;
    a handle being coupled to said container, said handle being graspable to facilitate relocation of said container;
    a door being hingedly coupled to said handle, said door being selectively pivoted over said open rear end of said container to close said open rear end;
    a plurality of wheels being rotatably coupled to said container, said wheels rolling along a support surface to facilitate relocation of said container; and
    said container including a top wall, a bottom wall and a perimeter wall extending between said top wall and said bottom wall, said handle being positioned adjacent said top wall and extending outwardly from said open rear end of said container, said perimeter wall has a front section with a hand recess to receive a hand to facilitate lifting of said container.

2. The device according to claim 1, wherein said top wall has a lower section being positioned over a motor and a deck of the lawn mower.

3. The device according to claim 2, wherein said top wall has an upper section being at a higher elevation than said lower section to be positioned over a handle bar of the lawn mower.

4. The device according to claim 1, wherein said perimeter wall has a plurality of vent slots extending therethrough to permit fumes from the lawn mower to vent out of said container.

5. The device according to claim 1, wherein each of a plurality of recessed wells of said container has one of said wheels positioned therein.

6. The device according to claim 1, wherein said door has a foot recess to receive a foot to facilitate tipping of the container.

7. The device according to claim 1, further comprising a plurality of tie downs being coupled to said container, said tie downs being used to secure said container to a support structure.

8. The device according to claim 1, further comprising a plurality of clips being coupled to said container, said clips being arranged in aligned pairs, a yard care implement being inserted to one of said aligned pairs of said clips to secure the yard care implement to said container.

9. The device according to claim 1, further comprising at least one securing loop being coupled to said door.

10. The device according to claim 9, further comprising at least one locking loop being coupled to said container and positioned adjacent said open rear end of said container, said at least one locking loop being aligned with said at least one securing loop when said door is positioned over said open rear end, said at least one securing loop and said at least one locking loop receiving a lock to secure said door over said open rear end when said at least one securing loop and said at least one locking loop are aligned.

11. A lawn mower cover device for covering a lawn mower, said device comprising:
    a container receiving the lawn mower to protect the lawn mower, said container having an open rear end to permit the lawn mower to be inserted into said container, said container including a top wall, a bottom wall and a perimeter wall extending between said top wall and said bottom wall, said top wall having a lower section being positioned over a motor and a deck of the lawn mower, said top wall having an upper section being at a higher elevation than said lower section to be positioned over a handle bar of the lawn mower, said perimeter wall having a front section with a hand recess to receive a hand to facilitate lifting of said container, said perimeter wall having a plurality of vent slots extending therethrough to permit fumes from the lawn mower to vent out of said container;
    a handle being coupled to said container, said handle being graspable to facilitate relocation of said container, said handle being positioned adjacent said top wall and extending outwardly from said open rear end of said container;
    a door being hingedly coupled to said handle, said door being selectively pivoted over said open rear end of said container to close said open rear end, said door having a foot recess to receive a foot to facilitate tipping of the container;
    a plurality of tie downs being coupled to said container, said tie downs being used to secure said container to a support structure, each of said tie downs being coupled to and extending upwardly from said top wall;
    a plurality of clips being coupled to said container, said clips being arranged in aligned pairs, a yard care implement being inserted to one of said aligned pairs of said clips to secure the yard care implement to said container, each of a pair of side sections of said perimeter wall having at least one aligned pair of said clips coupled thereto;
    at least one securing loop being coupled to said door;
    at least one locking loop being coupled to said container and positioned adjacent said open rear end of said container, said at least one locking loop being aligned with said at least one securing loop when said door is positioned over said open rear end, said at least one securing loop and said at least one locking loop receiving a lock to secure said door over said open rear end when said at least one securing loop and said at least one locking loop are aligned; and
    a plurality of wheels being rotatably coupled to said container, said wheels rolling along a support surface to facilitate relocation of said container, each of a plurality of recessed wells of said container having one of said wheels positioned therein, said recessed wells being positioned in a juncture of said perimeter wall and said bottom wall.

* * * * *